US008733161B1

(12) United States Patent
Decal et al.

(10) Patent No.: US 8,733,161 B1
(45) Date of Patent: May 27, 2014

(54) ELASTIC TIRE VALVE CAP HOLDER

(71) Applicants: Diego Decal, North Lauderdale, FL (US); Alvin S. Blum, Fort Lauderdale, FL (US)

(72) Inventors: Diego Decal, North Lauderdale, FL (US); Alvin S. Blum, Fort Lauderdale, FL (US)

( * ) Notice: Subject to any disclaimer, the term of this patent is extended or adjusted under 35 U.S.C. 154(b) by 129 days.

(21) Appl. No.: 13/621,725

(22) Filed: Sep. 17, 2012

(51) Int. Cl.
 *B60C 23/02* (2006.01)
(52) U.S. Cl.
 USPC ...................................................... 73/146.8
(58) Field of Classification Search
 USPC ................................................. 73/146–146.8
 See application file for complete search history.

(56) References Cited

U.S. PATENT DOCUMENTS

| 2,963,046 A | 12/1960 | Goodrich |
| 5,195,561 A | 3/1993 | Wilson |
| 6,279,600 B1 * | 8/2001 | Robinson ...................... 137/232 |
| 7,913,551 B2 * | 3/2011 | Bucknell ...................... 73/146.8 |
| 2010/0229640 A1 * | 9/2010 | Bucknell ...................... 73/146.8 |
| 2012/0318375 A1 * | 12/2012 | Schomann ................... 137/232 |
| 2012/0325769 A1 * | 12/2012 | Essebaggers et al. ........ 215/256 |

* cited by examiner

*Primary Examiner* — Andre Allen
(74) *Attorney, Agent, or Firm* — Alvin S. Blum

(57) ABSTRACT

This invention solves the problem of what to do with the valve cap when it is removed from the valve while checking tire pressure. A cap holder elastic or rubbery projection on the pressure gauge is adapted to removably receive the cap. Caps have a standard internal female thread. The projection has ridges that increase the outside diameter to greater than the inside diameter of the threaded portion. The ridges as composed of a rubbery material that is so soft that they will bend without damage to the cap threads when the cap is pressed on to the projection. It will remain there securely while the operator is checking or adjusting the tire pressure.

20 Claims, 3 Drawing Sheets

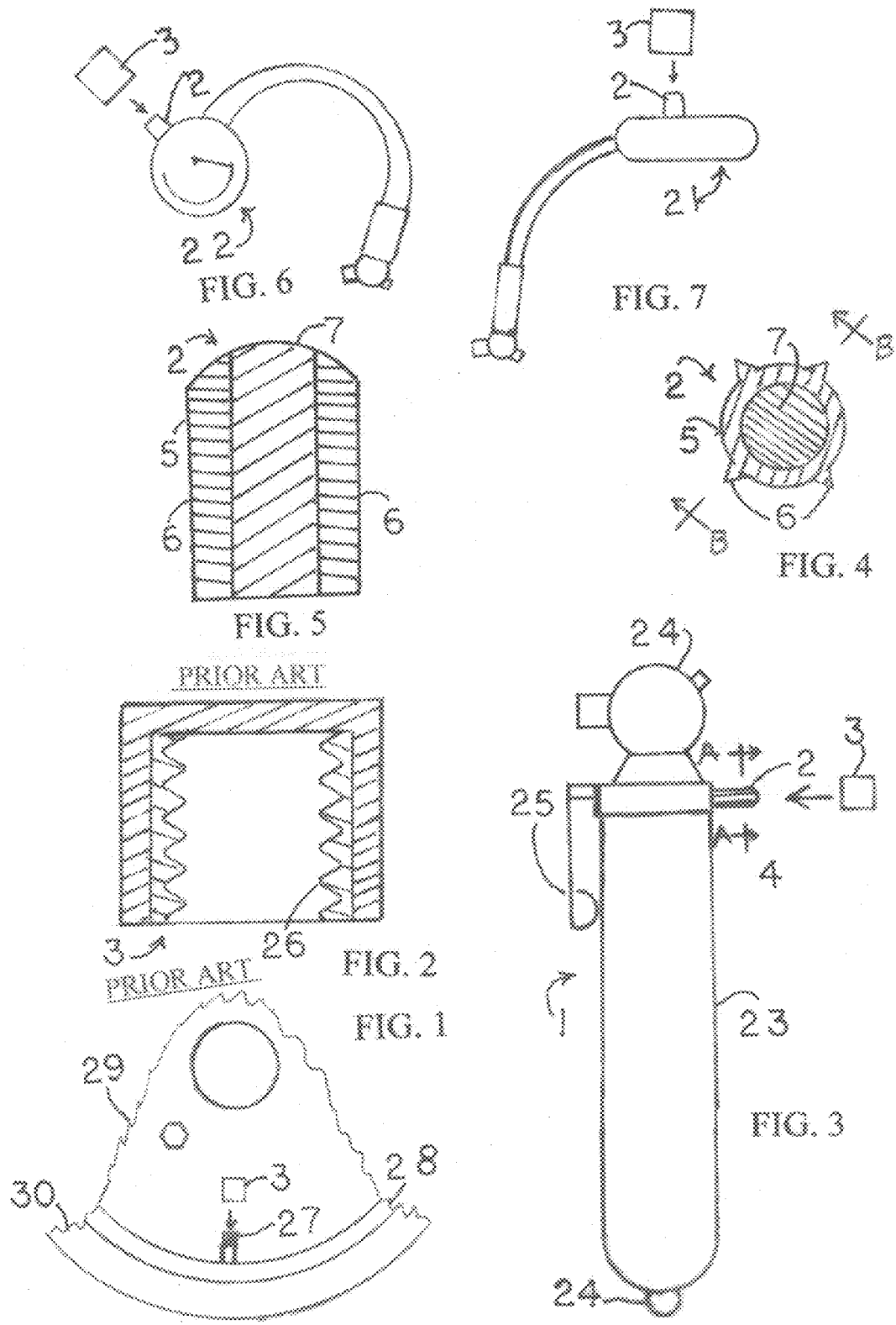

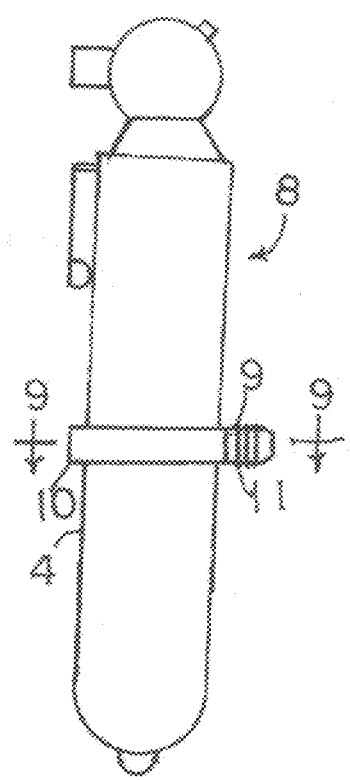
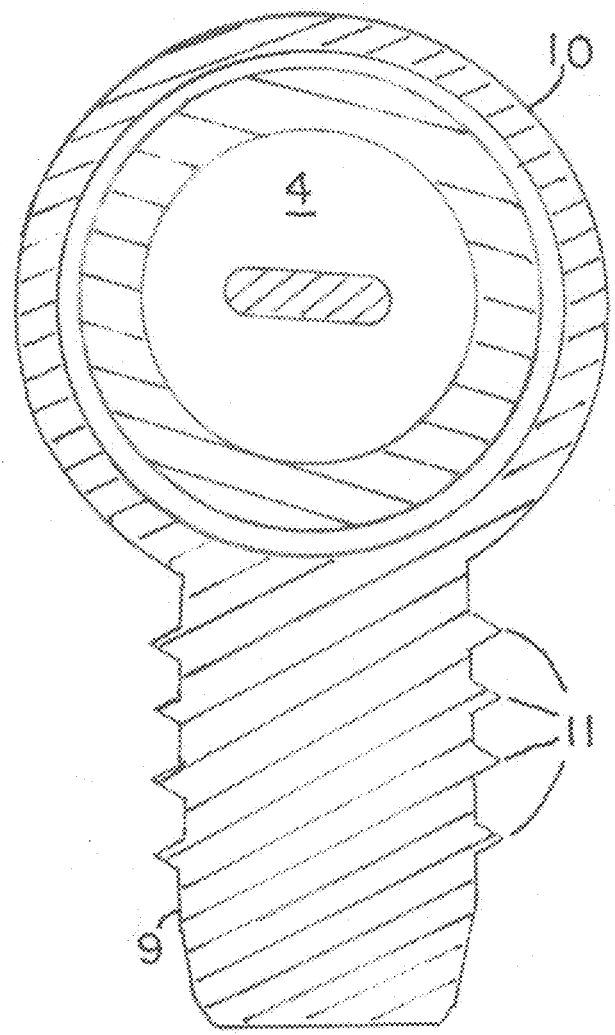
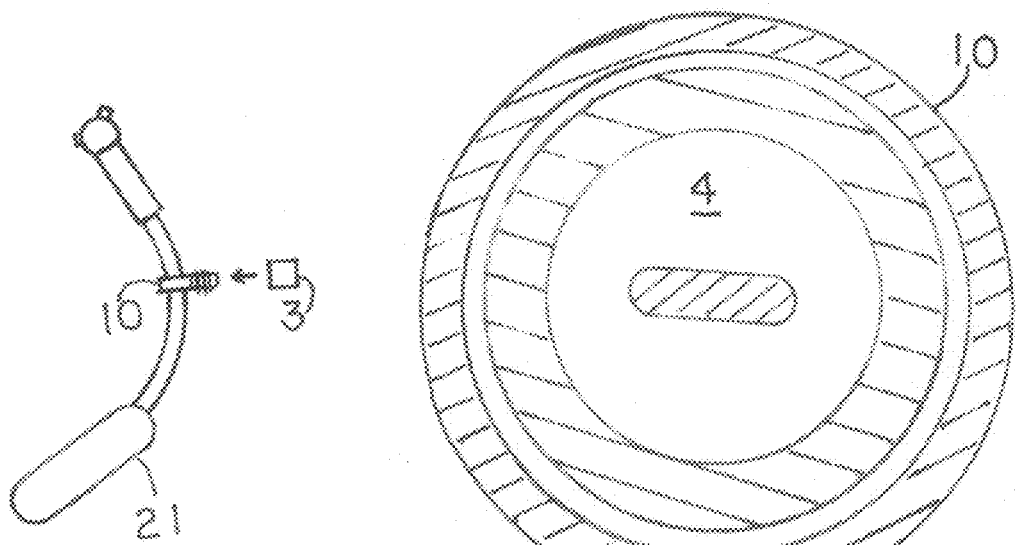
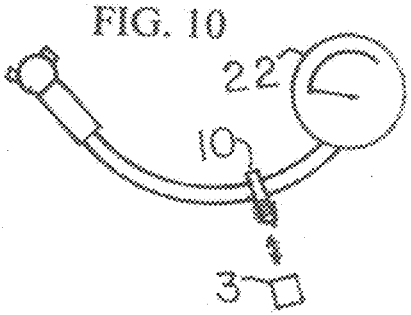
FIG. 11
FIG. 8
FIG. 9
FIG. 10

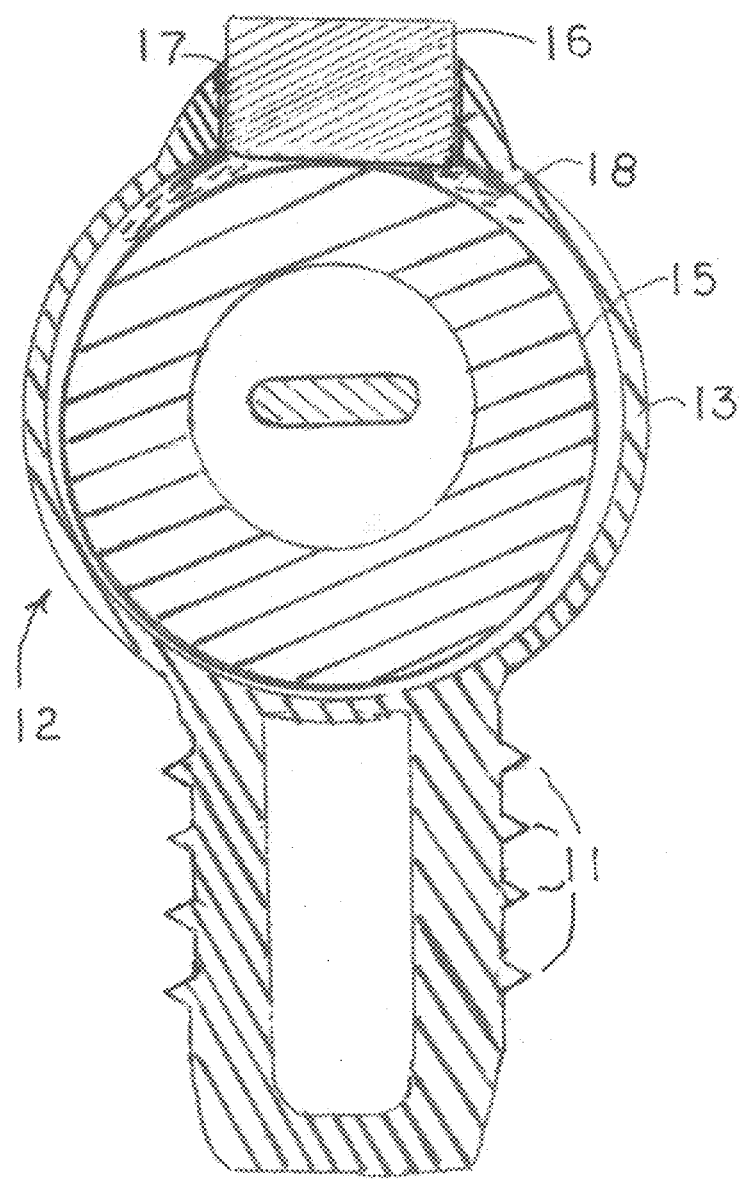

ELASTIC TIRE VALVE CAP HOLDER

FIELD OF THE INVENTION

This application claims the benefit of provisional patent application 61/690,180, filed Jun. 21, 2012.

This invention relates generally to checking pressure in the pneumatic tires of vehicles, and more particularly to improved apparatus for holding the cap or cover of the valve while measuring the tire pressure with a tire pressure gauge or adjusting the pressure.

SUMMARY OF THE INVENTION

Pneumatic vehicle tires are generally provided with a one way valve in a valve stem to allow gas under pressure to be introduced into the tire until a desired operating pressure is reached. A valve cap or cover is then applied to the stem to prevent materials from entering the valve and damaging its operation. The usual process in checking tire pressure is to remove the cap, apply the pressure gauge to the valve, and read the pressure. Then the cap is replaced on the valve. A problem often encountered is what to do with the valve cap after it is removed from the valve stem. This invention solves the problem by providing a cap holder in the form of an elastic or rubbery projection on the pressure gauge that is adapted to removably receive the cap. Alternatively, the projection may be rigid with a rubbery perimeter. Along one side wall of the gauge a permanent magnet may be affixed. Since tires are mounted on wheels that are secured to the vehicle by fasteners in the form of lug nuts or bolts that are ferromagnetic, it is a simple matter to place the gauge against one of these fasteners with the magnet against the fastener or against the ferromagnetic wheel when the gauge is not in use. It is dimensioned to correspond approximately to the male threaded portion of the standard tire pressure valve. The caps have an internal female thread that is often made of a plastic material. The projection of the invention is constructed with a portion having ridges or threads with an outside diameter adapted to fit into the internal female thread of the cap without damage to the threaded portion of the cap, while holding the cap securely. The portion adapted to fit inside the threaded portion of the cap may be provided with ridges or threads that increase the outside diameter to greater than the inside diameter of the threaded portion. The threads or ridges as composed of a rubbery material that is so soft that they will bend without damage to the cap threads when the cap is pressed on to the projection. It will remain there while the operator is checking or adjusting the tire pressure. When the process is completed, the cap is simply pulled off the projection and screwed onto the tire valve. There are several types of pressure gauges in common use: the electronic gauges with digital readout; elongate mechanical pen-shaped gauges with a graduated rod that is forced out by pressure; and dial type with flexible hose. The elastic projection may be affixed to any of the various types of gauges.

These and other objects and advantages will appear from the following description of illustrative embodiments of the present invention.

BRIEF DESCRIPTION OF THE DRAWINGS

FIG. 1 is a side view of a portion of a tire of the prior art.

FIG. 2 is a sectional view of a standard valve cap of the prior art.

FIG. 3 is a side elevation view of a pen type gauge of the invention.

FIG. 4 is a sectional view through line A-A of FIG. 3.

FIG. 5 is a sectional view through line B-B of FIG. 4.

FIG. 6 is a side elevation view of another embodiment of the invention.

FIG. 7 is a side elevation view of another embodiment of the invention.

FIG. 8 is a side view of another embodiment of the invention.

FIG. 9 is a sectional view through line 9-9 of FIG. 8.

FIG. 10 is a side elevation view of another embodiment of the invention.

FIG. 11 is a side elevation view of another embodiment of the invention.

FIG. 12 is a sectional view of another embodiment of the invention.

DETAILED DESCRIPTION OF PREFERRED EMBODIMENTS

This invention now will be described more fully hereinafter with reference to the accompanying drawings, in which exemplary embodiments are shown. This invention may, however, be embodied in many different forms and should not be construed as limited to the embodiments set forth here. Rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future.

Referring now to prior art FIGS. 1 and 2, a tire 30 is mounted on the rim 28 of a wheel 29. A valve pneumatically connected to the tire extends through the rim. It terminates in a threaded portion 27. A cylindrical valve cap or cover 3 has an internal female thread 26 to correspond to portion 27 of the cap. The valve cap is normally screwed onto the valve to keep out contaminants. The tire pressure must be checked with a pressure gauge periodically to ensure that the pressure does not fall too low. Low tire pressure reduces fuel economy, and increases tire wear and damage. The usual process in checking tire pressure is to remove the cap, apply the pressure gauge to the valve, and read the pressure. If the pressure is within acceptable range, remove the gauge, and replace the cap. If the pressure is low, the gauge is removed and compressed gas is added. Then the cap is replaced on the valve. Some newer models of vehicles are provided with automatic indicators of low tire pressure. The valve cap must still be removed to refill with gas. And a hand held gauge is often used to check the pressure after refilling.

The problem that is often encountered with this process is what to do with the valve cap after it is removed from the valve, while both hands are busy. To lay it on the ground may cause dirt to enter it and it may be lost in the dark or kicked aside inadvertently.

This invention solves the problem by providing a cap holder in the form of an elastic or rubbery projection on the pressure gauge that is adapted to removably receive the cap without requiring rotation of the cap as a threaded holder would require. Alternatively, the projection may be rigid with a rubbery perimeter.

Referring now to FIGS. 3-5, a tire pressure gauge and valve cap holder 1 of the invention includes a pen, or pencil type gauge 4 that is well known in the art with a pocket clip 25, a head 24 for fluid engaging of the valve, and a graduated indicator 24 that is pushed from a rigid cylindrical body 23 to indicate pressure. A projection 2 extends outwardly perpendicular to the body. An elastic perimeter 5 surrounds the projection. The perimeter is dimensioned to removably hold the cap 3 by simply pushing the cap onto the projection without requiring rotation of the cap. The longitudinal ridges 6 create an outside diameter of the projection that is slightly greater than the inside diameter of the cap. When the cap is pushed onto the projections the soft elastic nature of the ridges causes them to bend down to the inside diameter of the cap and to hold the cap securely, and to release it just as easily without damage to the threads of the cap, that are often made of plastic. The projection 2 may have a rigid core 7. Alternatively, the perimeter and core may be made of the same elastic material (not shown).

FIG. 6 shows a dial type gauge 22 of the invention with the projection 2.

FIG. 7 shows a digital type gauge 21 of the invention with the projection 2. Referring now to FIGS. 8 and 9, a tire pressure gauge and valve cap holder of the invention 8 includes a pen type gauge 4. A projection 9 is affixed to the gauge by an elastic band 10 and extending outwardly therefrom. The projection has an elastic perimeter and is configured to removably hold thereon a tire pressure valve cap by simply pushing the cap onto the projection without rotation and a perimeter of the projection being sufficiently yieldable to not damage the cap. A plurality of circumferential ridges 11 around the projection 9 provide outside diameters slightly greater than the inside diameter of the cap. When the cap is pushed onto the projection the soft elastic nature of the ridges causes them to bend down to the inside diameter of the cap and to hold the cap securely, and to release it just as easily without damage to the threads of the cap. In a preferred embodiment, the band 10 and projection 9 are monolithic. They may be molded of a thermoplastic elastomer or a rubbery compound such a silicone rubber or polyurethane, for example, but not limited to these materials.

FIG. 10 shows a dial type gauge 22 with the band 10 and projection 11.

FIG. 11 shows a digital type gauge 21 with the band 10 and the projection 11.

FIG. 12 shows a cross sectional view of another embodiment 12 of the invention.

A projection 14 is affixed to pen type gauge 15 by an elastic band 13 and extends outwardly therefrom. The projection has an elastic perimeter and is configured to removably hold thereon a tire pressure valve cap by simply pushing the cap onto the projection without rotation and a perimeter of the projection being sufficiently yieldable to not damage the cap. A plurality of circumferential ridges 11 around the projection 14 provide outside diameters slightly greater than the inside diameter of the cap. When the cap is pushed onto the projection the soft elastic nature of the ridges causes them to bend down to the inside diameter of the cap and to hold the cap securely, and to release it just as easily without damage to the threads of the cap. In a preferred embodiment, the band 13 and projection 14 are monolithic. Opposite the projection 14, is an opening 17 in the band. A magnet 16 with attached flange 18 is pushed into the opening. The flange prevents the magnet from being pulled through the opening. The magnet has sufficient holding power to hold the gauge on a ferromagnetic object on the wheel. This band with projection and magnet may be applied to the hose of the dial type gauge or the digital gauge as well.

While we have shown and described the preferred embodiments of our invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A tire pressure gauge and valve cap holder comprising:
    a tire pressure gauge having a projection affixed to the gauge and extending outwardly therefrom, the projection having an elastic outside diameter configured to engage internal threads of a tire pressure valve cap, and removably hold thereon the cap by simply pushing the cap onto the projection without rotation.

2. The tire pressure gauge of claim 1, in which the gauge is a mechanical pen gauge.

3. The tire pressure gauge of claim 1, in which the gauge is a dial gauge.

4. The tire pressure gauge of claim 1, in which the gauge is a digital gauge.

5. The tire pressure gauge of claim 1, further comprising a permanent magnet affixed to the gauge the magnet having sufficient holding power to hold the gauge when applied to a ferromagnetic object.

6. The tire pressure gauge of claim 5, in which the gauge is a mechanical pen gauge.

7. The tire pressure gauge of claim 5, in which the gauge is a dial gauge.

8. The tire pressure gauge of claim 5, in which the gauge is a digital gauge.

9. The tire pressure gauge of claim 1, in which the elastic outside diameter comprises ridges greater in diameter than inside diameter of the internal threads.

10. A tire pressure gauge and valve cap holder comprising:
    a tire pressure gauge and a projection affixed to the gauge by an elastic band and extending outwardly therefrom, the projection having an elastic outside diameter and configured to engage internal threads of a tire pressure valve cap and removably hold thereon the valve cap by simply pushing the cap onto the projection without rotation.

11. The tire pressure gauge of claim 10, in which the gauge is a mechanical pen gauge.

12. The tire pressure gauge of claim 11, in which the gauge is a digital gauge.

13. The tire pressure gauge of claim 10, in which the gauge is a dial gauge.

14. The tire pressure gauge of claim 10, in which the elastic band is monolithic with the projection.

15. The tire pressure gauge of claim 10, in which the elastic band holds a permanent magnet, the magnet having sufficient holding power to hold the gauge on a ferromagnetic object.

16. The tire pressure gauge of claim 10, in which the elastic outside diameter comprises ridges greater in diameter than inside diameter of the internal threads.

17. A tire valve cap holder for a tire valve gauge, the tire valve cap holder comprising:
    an elastic band dimensioned to fit securely on the tire valve gauge and an elastic projection extending outwardly from the band, the projection having an elastic outside diameter configured to engage internal threads of a tire pressure valve cap to thereby removably hold thereon a tire pressure valve cap by simply pushing the cap onto the projection without rotation.

18. The cap holder of claim 17, in which the elastic hand is monolithic with the projection.

19. The cap holder of claim 18, in which the elastic band is adapted to hold a permanent magnet against the gauge, the magnet having sufficient holding power to hold the gauge on a ferromagnetic object.

20. The cap holder of claim 17, in which the elastic outside diameter comprises ridges greater in diameter than inside diameter of the internal threads.

\* \* \* \* \*